United States Patent [19]

Randell et al.

[11] 3,720,616

[45] March 13, 1973

[54] HYDROXYBENZOTRIAZOLES AS METAL DEACTIVATORS

[75] Inventors: Donald Richard Randell, Stockport; Ernest Alfred Cox, Urmston, both of England

[73] Assignee: Ciba-Geigy Corporation, Ardsley, N.Y.

[22] Filed: Jan. 14, 1971

[21] Appl. No.: 106,532

Related U.S. Application Data

[62] Division of Ser. No. 745,115, July 16, 1968, abandoned.

[30] Foreign Application Priority Data

July 21, 1967 Great Britain .................33536/67

[52] U.S. Cl..................252/51.5 R, 252/70, 252/77, 252/392, 252/403, 260/45.8 N, 260/308 B, 260/814, 106/10, 106/11, 106/14, 106/263, 106/270, 106/271, 106/285

[51] Int. Cl. .........................C10m 1/20, C10m 1/32

[58] Field of Search......252/51.5 R, 70, 77, 392, 403; 260/45.8 N, 814, 308 B; 106/10, 11, 14, 263, 270, 271

[56] References Cited

UNITED STATES PATENTS 3,413,227  11/1968  Howard et al. ..................252/51.5 R Primary Examiner—Daniel E. Wyman
Assistant Examiner—W. U. Shine
Attorney—Karl F. Jorda et al.

[57] ABSTRACT

4-Hydroxy-5-alkyl-benzotriazoles are described as useful corrosion or tarnish inhibitors on metal surfaces, especially on copper, and as metal deactivators in functional fluids. Compositions containing the novel benzotriazoles or 4-hydroxy-benzotriazole and a process for making these compounds in a particularly advantageous manner are also described.

9 Claims, No Drawings

HYDROXYBENZOTRIAZOLES AS METAL DEACTIVATORS

CROSS-REFERENCE TO RELATED APPLICATION

This is a division of application Ser. No. 745,115 filed July 16, 1968, now abandoned.

The present invention concerns a new class of corrosion or tarnish inhibitors for metals, especially copper, processes for the production of new compounds pertaining to the said class and the use of the compounds as metal deactivators in functional fluids.

In a first aspect, the present invention provides new substituted benzotriazoles having the formula

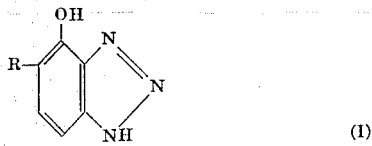

wherein R represents a straight- or branched-chain alkyl group having from one to four carbon atoms, for instance, methyl, ethyl, n-propyl isopropyl or n-butyl.

Hitherto, 4-hydroxy-benzotriazole [described by Fries et al. "Annalen der Chemie", Vol. 511, p. 213 et seq. (1934) as "α-oxy-asimidobenzol"] has been produced from benzotriazole by nitration to 4-nitrobenzotriazole, reduction of the latter to 4-aminobenzotriazole by diazotation and subsequent hydrolyzation by boiling.

The invention provides, as a second aspect, a simpler process of producing in high yields a benzotriazole compound having the formula

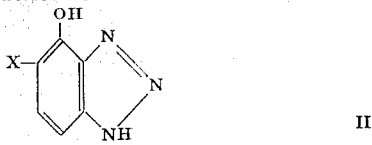

wherein X represents hydrogen or a straight- or branched-chain alkyl group having from one to four carbon atoms, which process avoids nitration and diazotation and comprises sulfonating a benzotriazole having the formula

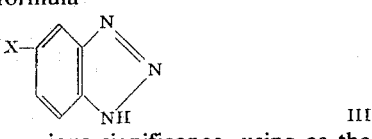

wherein X has its previous significance, using as the sulphonating agent oleum, alone or in admixture with concentrated sulphuric acid, and hydrolyzing the sulphonated product by fusing with an alkali metal hydroxide.

The sulphonation process of the present invention is conveniently carried out by adding the compound of formula III slowly, with good agitation to the acid and controlling the ensuing exothermic reaction by external cooling. Preferably, the temperature of the sulphonation mixture during the initial mixing is not allowed to exceed 80°C. When all the starting-material has been added and sulphonation is complete, the sulphonated product may isolated, for instance, by pouring the sulphonation reaction mixture into an excess of cold water. In this way, the sulphonated product may be precipitated and, if desired, washed free from mineral acid and dried. The sulphonated product may then be hydrolyzed to the corresponding 4-hydroxy compound by charging the sulphonated product and the alkali metal hydroxide together with a little water into a reactor resistant to corrosion by alkali, for instance, a nickel, copper or iron reactor. This mixture is then stirred and heated to an elevated temperature, preferably a temperature within the range of from 220° to 300° C., during which heating the reaction mass becomes molten. Heating at this elevated temperature is then continued for a sufficient time to ensure that substantially complete hydrolysis of the sulphonated product has been effected. In general, a period of heating of, for example, from 15 minutes to 60 minutes is sufficient to ensure complete hydrolysis. The compound of formula II may then be isolated, for instance, by cooling the fusion mixture, diluting this mixture with water and adding the cooled, diluted mixture to an excess amount of hydrochloric acid which has preferably been cooled in ice. From this modified mixture, the desired product of Formula II normally crystallizes out.

If the starting-material for the process of this invention is benzotriazole itself, then the benzotriazole is preferably a very pure grade, for instance, a grade suitable for use for photographic purposes.

Similarly, if the starting-material is a 5-alkyl benzotriazole, this is also preferably of a pure grade and may be obtained in this form, for example, by the process described and claimed in British Patent Specification No. 1,065,995.

The mixture of acids employed in the sulphonation step of the process of this invention comprises oleum alone or in admixture with concentrated sulphuric acid. Preferably, the oleum employed has a high sulphur trioxide content, for instance a sulphur trioxide content of at least 50 percent by weight and more preferably of at least 60 percent by weight, based on the weight of the acid. Where a mixture of oleum and concentrated sulphuric acid is used, the relative proportions of the oleum and concentrated sulphuric acid in the acid mixture may be important for optimum conversions. Thus, in the case of the sulphonation of benzotriazole, the proportion of oleum to concentrated sulphuric acid may advantageously be within the range of from 50 to 70 percent : 50 to 30 percent by weight respectively, an oleum : concentrated sulphuric acid ratio of about 60 percent : 40 percent by weight being particularly preferred. However, in the case of the sulphonation of 5-alkyl derivatives of benzotriazole, we have found that the sulphonation reaction proceeds smoothly and in good yield using oleum as the sole sulphonating agent and that the use of concentrated sulphonic acid as a diluent is unnecessary.

The sulphonation process proceeds smoothly and quickly at temperatures within the range of from 80° to 200° C., particularly form 100° to 140° C., and these ranges are therefore preferred.

It is preferred that the amount of acid employed is at least the stoichiometric proportion required for complete sulphonation of the benzotriazole starting material. More preferably, the amount of acid used is in substantial excess of that stoichiometric proportion required, for instance an amount of up to three molar proportions of acid per molar proportion of the compound of formula III.

Although any alkali metal hydroxide may be employed in the caustic fusion step of the process of this invention, it is preferred to use sodium hydroxide or potassium hydroxide or mixtures thereof.

The hydrolysis of the sulphonated product may be performed at the temperature of melting of the reaction mixture but the use of temperatures above the melting-point, for example, a temperature within the range of from 220° to 300° C. are preferred.

Advantageously, a substantial excess of alkali metal hydroxide, for instance an excess of up to six molar proportions, preferably an excess within the range of from three to six molar proportions of alkali per mole of sulphonated starting-material is employed in the fusion step.

The benzotriazoles of Formula II have valuable corrosion-inhibiting, tarnish-inhibiting or other preservative properties when applied to metal surfaces. They may be used as metal corrosion or tarnish inhibitors in a wide variety of functional materials susceptible to deterioration of function. The deterioration of functional materials in contact with metal surfaces may be due to corrosive action of the material on the metal surface and subsequent oxidative breakdown of the material activated by dissolved metal ions. The benzotriazoles of Formula II may therefore be used in such functional materials as metal protective ingredients to inhibit such deterioration.

The present invention therefore provides as a third aspect, a composition comprising a functional material susceptible to deterioration of function when in contact with a metal, and, as metal deactivator, a benzotriazole compound of Formula II.

Examples of functional materials into which the compounds of Formula II may be incorporated include natural and synthetic lubricants, hydraulic fluids, mineral oil-based turbine and transformer oils, varnishes, wax polishes and polymeric substances such as rubber, polypropylene, polyvinyl chloride and acrylonitrile/butadiene/styrene terpolymer: and aqueous media, for instance aqueous ethylene glycol or other glycol-containing compositions finding application as anti-freeze or other coolant mixtures.

The compounds of Formula II are thus valuable additives for natural and synthetic lubricant compositions, for instance in compositions in which it is desired to have present an antioxidant, for example dioctyl diphenylamine, which tends to bring about corrosion of any copper or copper alloy with which it comes into contact, unless a copper inhibitor is present in the lubricant. The conventional copper deactivator presently employed in synthetic ester lubricants is benzotriazole. However, it has been found that a substantial improvement in the deactivation of copper in contact with synthetic ester lubricants is brought about by the use of the substituted benzotriazoles of Formula II.

The compounds of this invention may also be employed as metal deactivators to inhibit degradation of polymeric structure in contact with copper. They may, for example, be advantageously incorporated into polypropylene material intended for use as covering material for copper wire or other copper articles, which materials may otherwise be susceptible to rapid degradation in the presence of copper.

While the benzotriazoles of Formula II may be used in the compositions of this invention as a metal deactivator for a wide variety of metals, for example iron, silver or cadmium or alloys containing these metals, the compounds of Formula II of this invention are particularly useful as metal deactivators for copper or copper alloys in contact with the said functional materials.

The proportion of the benzotriazoles of Formula II which is employed in the composition of this invention is preferably within the range of from 0.01 to 10 percent, more preferably within the range of from 0.1 to 5 percent by weight based on the total weight of the functional material.

A further application of the metal corrosion-inhibiting properties of the benzotriazoles of Formula II is the treatment of metal surfaces with these benzotriazoles in order to protect the surfaces from corrosion or tarnishing by contact with a noxious environment.

Thus, the present invention provides, as a fourth aspect, a method of treating a metal surface, comprising contacting of metal surface with a composition comprising an inert carrier and, as corrosion or tarnish inhibitor, a benzotriazole of Formula II.

Metal surfaces may be treated with the benzotriazoles of this invention, in order to preserve them against corrosion or tarnishing, by contacting the surfaces with the benzotriazole compounds in the vapor phase or in the form of a solution, for instance in aqueous, glycol or polyglycol solvents, the compositions comprising the benzotriazole compounds may be applied in any conventional manner for treating metal surfaces, for example by spraying on as a solution, by immersing the metal in a solution, or by wrapping the metal in paper or other packaging material containing the said benzotriazole inhibitor. If the metal is treated with a solution of the benzotriazole of formula II, the solution preferably contains a proportion of the benzotriazole compound within the range of from 0.01 to 10 percent, more preferably within the range of from 0.1 to 5 percent by weight based on the total weight of the solution.

Again, while the benzotriazoles of this invention may be used to treat a wide range of metals or alloys containing these metals, which metal or alloy surfaces are susceptible to corrosion, tarnishing or other deterioration due to contact with hydrogen sulphide, ammonia or other noxious environment detrimental to the utility or appearance of the surfaces, the compounds of this invention are particularly useful in inhibiting the corrosion or tarnishing of copper or copper alloy surfaces. Furthermore, the treatment of copper or copper alloy surfaces with the compounds of the present invention may have the effect of enabling steam or other vapors to condense thereon as droplets, and the compounds are thus valuable in improving the heat transfer properties of copper or copper alloy condensers or other articles.

The following examples further illustrate the present invention. Parts by weight shown therein bear the same relation to parts by volume as do kilograms to liters. Percentages are expressed by weight unless otherwise stated.

EXAMPLE 1

A. To a stirred mixture of 60 parts of 63 percent oleum, 40 parts of concentrated sulphuric acid and 1 part of mercuric oxide, contained in a glass reactor, there was added 59.5 parts of benzotriazole, portionwise, while the temperature of the exothermic reaction was maintained below 80°C. by means of external cooling.

When the addition of benzotriazole had been completed, the sulphonation mixture was heated to 120°C. for 2 hours, cooled to 100°C. and poured on to 250 parts of crushed ice.

The white solid which was precipitated was filtered off, washed with a little ice-cold water and dried in an oven at 80°C.

In this way, there were obtained 58 parts (57 percent theoretical yield) of benzotriazole-4-sulphonic acid having melting-point of >300°C, and the following elemental analysis by weight:

|  | Carbon | Hydrogen | Nitrogen | Sulphur |
|---|---|---|---|---|
| Calculated (for $C_6H_5N_3SO_3$): | 36.19% | 2.53% | 21.10% | 16.07% |
| Found: | 36.49% | 2.44% | 21.28% | 15.99% |

B. 26.4 parts of benzotriazole-4-sulphonic acid, 46 parts of potassium hydroxide and six parts of water were stirred together and heated to a temperature in the range of 240° to 260°C, and maintained at this temperature range for 30 minutes. The mixture was allowed to cool and diluted with 250 parts of water and filtered. The pH value of the filtrate was adjusted to pH 1.0 with concentrated hydrochloric acid. 10.5 parts of crude 4-hydroxy-benzotriazole crystallized out from this acidified solution. Recrystallization from water afforded the pure 4-hydroxy-benzotriazole having a melting-point of 217°C. Another batch of 4-hydroxy-benzotriazole can be recovered by elaboration of the mother liquor, raiding the total yield rate, calculated on benzotriazole as starting material, to 735 percent of the theory.

EXAMPLE 2

A. Eighty-six parts of 5-methyl benzotriazole were added portionwise to a stirred mixture of 129 parts of 65 percent oleum and 0.8 part of mercuric oxide, and the temperature of the exothermic reaction was maintained below 80°C. by applying external cooling.

When the addition of 5-methyl benzotriazole had been completed, the sulphonation mixture was heated at a temperature in the range of from 110° to 120°C. for 3 hours. The mixture was then poured on to 160 parts of crushed ice.

The solid which precipitated was filtered off, washed with a little ice-cold water and dried in an oven, at 80°C.

In this way, there were obtained 132 parts (99 percent theoretical yield) of 5-methyl benzotriazole-4-sulphonic acid having melting-point of about 300°C. (decomposition). Recrystallization of the crude product from water gave 109 parts of pure material having the following elemental analysis by weight:

|  | Carbon | Hydrogen | Nitrogen | Sulphur |
|---|---|---|---|---|
| Calculated (for $C_7H_7N_3SO_3$): | 39.45% | 3.31% | 19.71% | 15.01% |
| Found: | 39.27% | 3.48% | 19.68% | 14.87% |

B. The mixture of 49 parts of 5-methyl-benzotriazole-4-sulphonic acid, 80.5 parts of potassium hydroxide and 10.5 parts of water was heated to 250°C. and maintained at this temperature for 30 minutes. After cooling the mixture, it was diluted with 350 parts of water and the diluted mixture was then filtered. The pH value of the filtrate was adjusted to pH 1.0 with concentrated hydrochloric acid, and the solid which crystallized from the acidified solution was filtered off, dried and recrystallized from water.

In this way, there were obtained 17.0 parts (40.5 percent theoretical yield) of 4-hydroxy-5-methyl-benzotriazole having melting-point 256°C. (decomposition) and the following elemental analysis by weight:

|  | Carbon | Hydorgen | Nitrogen |
|---|---|---|---|
| Calculated (for $C_7H_7N_3O$): | 56.36% | 4.73% | 20.17% |
|  | 56.25% | 4.71% | 27.99% |

EXAMPLE 3

A. Sixty-five parts of 5-n-butyl-benzotriazole were added portionwise to a stirred mixture of 129 parts of 75 parts of 65 percent oleum and 1.0 part of mercuric oxide and the mixture was heated at 110° to 120°C. for 3 hours. The reaction mixture was poured into an excess of cold water and filtered. The sticky black mass so obtained was stirred with acetene, filtered and crystalized from water. In this way, 22 parts of 5-n-butyl-benzotriazole-4-sulphonic acid were obtained having melting-point >290°C. (decomposition) and the following elemental analysis by weight:

|  | Carbon | Hydrogen | Nitrogen |
|---|---|---|---|
| Found: | 47.3% | 5.3% | 16.8% |
| Calculated (for $C_{10}H_{13}N_3So_3$): | 47.1% | 5.2% | 16.5% |

B. A mixture of 10.2 parts of 5-n-butyl-benzotriazole-4-sulphonic acid, 7.9 parts of 85 percent aqueous potassium hydroxide and 36 parts of water was heated to 250°C. and maintained at this temperature for 30 minutes. After cooling, the reaction mixture was diluted with 30 parts of water and the diluted mixture filtered. The pH value of the mixture was adjusted to pH 1.0 with concentrated hydrochloric acid, and the solid which crystallized from the acidified solution was crystallized from water. In this way, a crude product containing 5-n-butyl-4-hydroxy-benzotriazole was obtained.

EXAMPLES 4 to 6

Synthetic ester-based lubricant compositions were prepared into which were incorporated 3.0 percent by weight of N-tertiaryoctyl-phenyl-β-naphthylamine as antioxidant, and each of the compositions was subjected to the Pratt & Whitney Type II oxidation-corrosion test. The basic fluid in each of the tests was trimethylolprepane tripelargonate, and each test was carried out for 48 hours at 425°F. with dry air at the rate of 5 liters per hour and in the presence of specimens of magnesium alloy, alluminium alloy, copper, silver and steel.

To each lubricant sample there was also added 4-hydroxy benzotriazole or 4-hydroxy-5-methyl-benzotriazole in the proportion of either 0.25 percent or 0.50 percent by weight.

The results of the tests are shown in the following Table wherein comparative data is included employing benzotriazole itself instead of 4-hydroxy-benzotriazole. In the table, the sludge is expressed in milligrams and the weight change of the specimens as milligrams per square centimeter.

| Example | Additive | % additive | Sludge | Weight Change of specimens | | |
|---|---|---|---|---|---|---|
| | | | | Cu | Ag | Mg |
| - | benzotriazole | 0.25 | 4.3 | −0.10 | −0.10 | −0.06 |
| - | benzotriazole | 0.5 | 12.5 | 0.01 | −0.07 | −0.04 |
| 4 | 4-hydroxy-benzotriazole | 0.25 | 7.7 | −0.03 | −0.02 | −0.01 |
| 5 | 4-hydroxy-benzotriazole | 0.5 | 8.6 | −0.04 | −0.02 | +0.01 |
| 6 | 4-hydroxy-5-methyl benzotriazole | 0.25 | 2.1 | +0.01 | +0.02 | 0.02 |

From the data contained in the Table it can be seen that the lubricant compositions containing compounds of the present invention, particularly 4-hydroxy-5-methyl-benzotriazole, possess substantially better metal-corrosion properties and also forms less sludge than conventional compositions.

We claim:

1. A composition comprising (1) a functional material susceptible of deterioration of function when in contact with a metal, said functional material selected from the group consisting of natural lubricants, synthetic hydraulic fluids, mineral oil-based turbine and transformer oils, varnishes, wax polishes, rubber, polypropylene, polyvinyl chloride, acrylonitrile/butadiene/styrene terpolymer and aqueous anti-freeze and coolant mixtures containing glycol compositions, and (2) in metal-deactivating amount, a compound of the formula

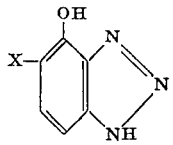 II wherein X represents hydrogen or alkyl of from one to four carbon atoms.

2. A composition as described in claim 1 wherein the proportion of the compound of formula II is within the range of from 0.01 to 10 percent by weight, based on the total weight of the functional material.

3. A composition as described in claim 1, wherein the proportion of the compound of formula II is within the range of from 0.1 to 5 percent by weight based on the total weight of the functional material.

4. A composition as described in claim 1, wherein the functional material is a natural or synthetic lubricant, an hydraulic fluid, a mineral oil-based turbine or transformer oil, a varnish or, a wax polish.

5. A composition as described in claim 1, wherein the functional material is rubber, polypropylene, polyvinyl chloride or an acrylonitrile/butadiene/styrene terpolymer.

6. A composition as described in claim 1, wherein the functional material is an aqueous glycol-containing anti-freeze or coolant.

7. A composition as described in claim 4, wherein the functional material is a natural or synthetic lubricant containing an antioxidant.

8. A composition as described in claim 7, wherein the antioxidant is dioctyl diphenylamine.

9. A composition as described in claim 5, wherein the functional material is copper wire covering material consisting essentially of polypropylene.

* * * * *